US005566991A

United States Patent [19]

Young

[11] Patent Number: 5,566,991

[45] Date of Patent: Oct. 22, 1996

[54] LOCK WITH CAM OPERATED MECHANISM

[75] Inventor: Quentin Young, Channahon, Ill.

[73] Assignee: R R Brink Locking Systems, Inc., Shorewood, Ill.

[21] Appl. No.: 330,471

[22] Filed: Oct. 28, 1994

[51] Int. Cl.$^{6}$ .......... C05C 3/06

[52] U.S. Cl. .......... 292/201; 292/336; 292/341.16

[58] Field of Search .......... 292/201, 341.16, 292/336, DIG. 46; 70/279, 282

[56] References Cited

U.S. PATENT DOCUMENTS

| | | | |
|---|---|---|---|
| 3,211,850 | 10/1965 | Toepfer | 292/341.16 X |
| 3,819,215 | 6/1974 | Fuss | 292/341.16 X |
| 4,126,341 | 11/1978 | Bradstock | 292/201 |
| 4,211,443 | 7/1980 | Butts et al. | 292/341.16 |
| 4,237,711 | 12/1980 | Kambic | 70/150 |
| 4,677,834 | 7/1987 | Hicks | 70/279 |
| 4,756,566 | 7/1988 | Logas | 292/341.16 |
| 4,881,766 | 11/1989 | Schmidt | 292/201 |

*Primary Examiner*—Steven N. Meyers
*Assistant Examiner*—Monica E. Millner
*Attorney, Agent, or Firm*—Trexler, Bushnell, Giangiorgi & Blackstone, Ltd.

[57] ABSTRACT

A locking mechanism which is mountable in a door assembly including a door and a frame. The locking mechanism includes a latch belt assembly, a drive motor and a cam assembly connected to the latch bolt assembly and the drive motor by a linkage assembly. The cam assembly is driven by the motor and provides a mechanical advantage in operating the linkage assembly and the connected latch bolt. The lock mechanism includes a mechanical latch back feature which retains the latch bolt in a retracted position until the door is closed relative to the frame. Also included are switches coupled to the motor for use in controlling the motor based on the position of the cam.

22 Claims, 5 Drawing Sheets

LOCK WITH CAM OPERATED MECHANISM

BACKGROUND

The present invention relates to a lock mechanism designed for mortise mounting in a door assembly including a door and frame. More particularly, the present invention relates to a lock mechanism which operates even in the presence of a force applied to the door.

A number of security locks are available for mortise mounting in door assemblies. An example of such a lock mechanism, referred to as a security lock, is shown in U.S. Pat. No. 4,237,711 to Kambic, assigned to the assignee of the present invention. The device as shown in Kambic utilizes a retractable latch Dolt and a biased deadlock latch associated with the latch bolt to urge the deadlock member into a locking position. A drive lever is associated with the latch bolt and the deadlock latch. A solenoid is used to move the drive lever and thereby move the associated latch bolt if it is not limited by the position of the deadlock latch. The lock mechanism is retained in the door frame with the latch bolt projecting into a recess formed in an opposing surface of the door frame.

Such security locks are valuable for locking doors in applications such as correction facilities, restricted access areas, and other security applications to control access. In these applications, a security lock may be connected to a remote switch such that the switch operates the solenoid associated with the drive lever. When the door is closed and the latch bolt is the locked position projecting into the recess of the opposed door frame, the deadlock latch is engaged to prevent movement of the latch bolt out the recess. The deadlock latch prevents tampering with the door by way of tools or other devices which might otherwise be positioned between the door and frame to displace the latch bolt from the recess.

When access is permitted the remote switch is activated thereby driving the solenoid to disengage the deadlock latch and move the driver lever to retract the latch bolt into the lock mechanism. Retracting the latch bolt into the lock mechanism removes the latch bolt from the corresponding recess after which the door can be moved relative to the frame.

While this type of operation may be satisfactory under many circumstances, the type of solenoid used to drive the lock mechanism may be limited in driving power. Basically, the solenoid functions quite well when the latch bolt fits into the recess without interference or when side loads are not applied to the door. The solenoid operates when the remote switch is activated to electrically displace a shaft in the solenoid thereby operating the latch bolt by way of the connecting linkage therebetween. When the remote switch is released, the solenoid returns the latch bolt to the extended position by way of a spring operated return in the solenoid assembly. The driving force of the solenoid is limited by the ability to displace the shaft in the solenoid and the strength of the return spring in the solenoid assembly.

Under some circumstances, it is important to be able to operate the lock mechanism in the presence of forces applied transversely to the door and latch bolt. For example, if the latch bolt does not properly fit as a result of dimensional differences between the door and frame, the solenoid may not provide sufficient driving power to operate the latch bolt. Similarly, if a force is applied transversely to the surface of the door, the forces tend to be concentrated at the latch bolt. The concentrated forces between the latch bolt and the recess prevent the latch bolt from being retracted by the solenoid if such forces are greater than the driving force of the solenoid. Forces may be applied to a door intentionally such as when an inmate wants to prevent the door from opening or unintentionally such as when the person passing through the door mistakenly pushes or pulls on the door opposite the direction of opening.

Further, the solenoid is limited in its operation in holding the latch bolt in an opened position. In the solenoid operated mechanism, the solenoid must be activated in order to hold the latch bolt in the open position. If the latch bolt is to be held in an open position for an extended period of time, the solenoid must be operated continuously for a corresponding extended period of time. It is undesirable to maintain a solenoid in the activated condition for extended periods since this can lead to excessive strain or wear on the solenoid. Alternatively, the solenoid must be operated each time the door is to be opened. It should be noted that in an application where the solenoid is not to be operated for extended periods of time, the solenoid operated lock functions in an acceptable manner without undue wear or strain on the solenoid. However, there are applications where it is desirable to maintain the latch bolt in the open, unlocked or retracted position.

As an additional matter, it would be desirable to provide a mechanical device to retain the latch bolt in a retracted position. It would also be desirable to provide a mechanical holdback device for the latch bolt which is automatically disengaged by appropriate circumstances such as the door closing against the jamb.

OBJECTS AND SUMMARY

A general object of the present invention is to provide a locking mechanism which is operable even when transverse forces are applied to the latch bolt of the locking mechanism.

Another object of the present invention is to provide a locking mechanism which is controllable to maintain the latch bolt in a selected position.

Yet another object of the present invention is to provide a lock mechanism which mechanically retains the latch bolt in a retracted position until the door closes to release the latch bolt from the retracted position.

Briefly, and in accordance with the foregoing, the present invention envisions a locking mechanism which is mountable in a door assembly including a door and a frame. The locking mechanism includes a latch bolt assembly, a drive motor and a cam assembly connected to the latch bolt assembly and the drive motor by a linkage assembly. The cam assembly is driven by the motor and provides a mechanical advantage in operating the linkage assembly and the connected latch bolt. The lock mechanism includes a mechanical latch back feature which retains the latch bolt in a retracted position until the door is opened relative to the frame. Also included are switches coupled to the motor for use in controlling the motor based on the position of the cam.

Other advantages and features of the invention will become apparent following the description of the drawings and discussion of the preferred embodiment of the invention provided hereinbelow.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which.

DETAILED DESCRIPTION OF THE PREFERRED EMBODIMENT

Figure 1:
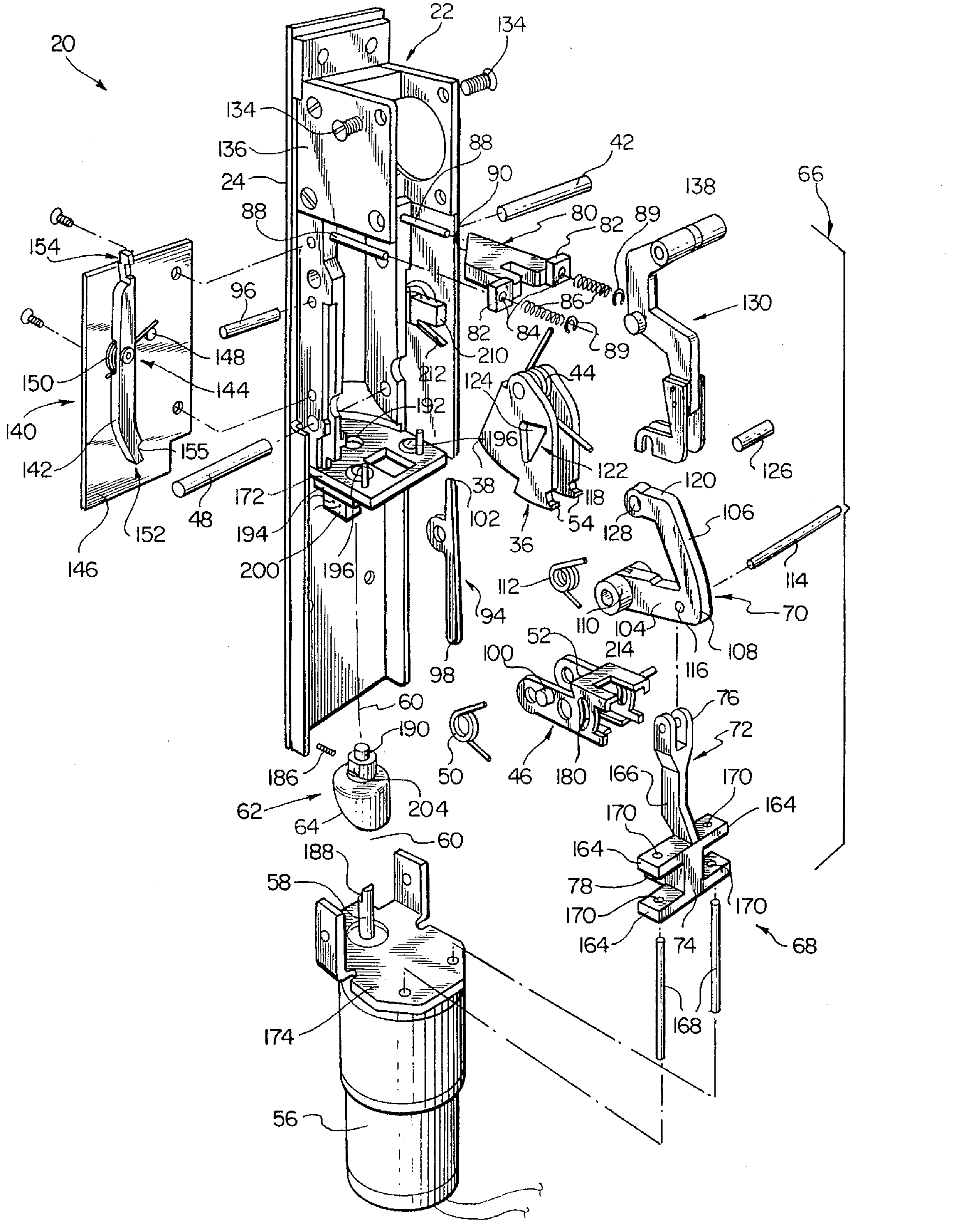
FIG. 1 is an exploded perspective view of a lock mechanism constructed in accordance with the present invention.

While the invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

With reference to FIG. 1, the lock mechanism 20 is shown in an exploded view to show the components arid assemblies as will be described in further detail with reference to FIGS. 2–11. The lock mechanisms 20 includes a chassis 22 with a face plate 24 attached thereto. The face plate 24 is more clearly shown in FIG. 7. The lock mechanism 20 is used with a door assembly 26 including a door 28 which is sized and dimensioned for closing and opening relative to a wall or door frame 30. The lock mechanism 20 is sized and dimensioned to be retained in a cavity 32 formed in the door 28. It should be noted that the lock mechanism 20 could also be attached to a cavity formed in the frame 30. The opposing frame 30 includes a recess 34 which receives a latch bolt 36 extending from the lock mechanism 20.

Figure 7:
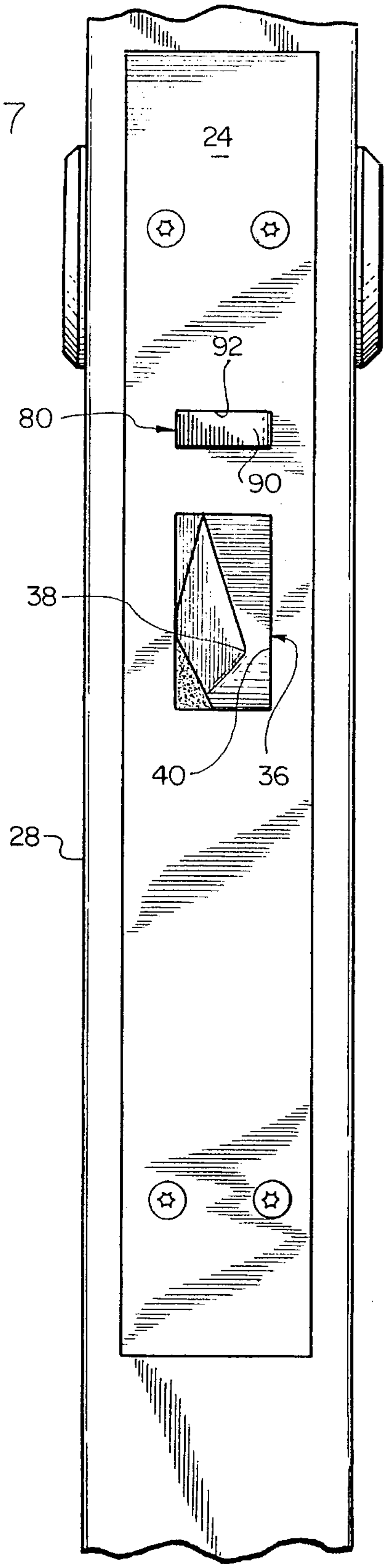
FIG. 7 is a side elevational view taken along line 7—7 in FIG. 6 showing a face plate of the lock mechanism with the latch bolt and deadlock trigger extending therefrom.

With further reference to FIGS. 2–11, the latch bolt 36 is biased in a position in which a tip 38 of the latch bolt 36 extends through a first aperture or latch aperture 40 formed in the face plate 24 (see FIG. 7). The latch bolt 36 is pivotally retained on the chassis 22 by the latch bolt shaft 42. Biasing means 44 are retained on the shaft 42 to bias the latch bolt 36 outwardly through the latch aperture 40.

A deadlock latch 46 is similarly pivotally attached by a deadlock shaft 48 connected to the chassis 22. The deadlock latch 46 is biased by biasing means 50 so that a lip 52 of the deadlock latch 46 engages cooperatively positioned teeth 54 extending from the latch bolt 36.

A motor 56 is attached to the chassis 22 and includes a drive shaft 58 extending therefrom defining a central axis 60. As will be described in greater detail hereinbelow, the drive motor 56 provides a driving force to operate the latch bolt 36 by way of cam means 62 and a linkage assembly 66.

The cam means or cam body 62 is attached to the drive shaft 58. As shown in the preferred embodiment, the cam body 62 is an eccentric rotary cylinder cam having a driving surface 64 lying in a plane generally disposed at an angle to the central axis 60.

The linkage assembly 66 aids in transmitting forces from the motor 56 and the cam means 62 to the latch bolt 36. The linkage assembly 66 includes a cam follower 68 operatively associated with the cam body 62 and a drive lever 70 which is attached to the chassis 22, the cam follower 68 and the latch bolt 36. The cam follower 68 includes an offset drive link 72 having a first end 74 operatively associated with the cam body 62 and a second end 76 attached to the drive lever 70. As more clearly shown in FIGS. 3, 5 and 6, a cam roller or bearing 78 is attached to the first end 74 and is cooperatively engaged with the driving surface 64 of the cam body 62.

A deadlock trigger 80 is attached to the chassis for operating the deadlock latch 46. The trigger 80 has mounting flanges 82 extending therefrom with apertures 84 formed therethrough. The trigger 80 is retained on shafts 88 attached to the chassis 22 and extending through the apertures 84 with biasing springs 86 retained on the ends of the shafts 88 by retainers or retaining rings 89. The biasing spring 86 maintain the trigger 80 in an extended condition whereby the slopped tip 90 of the trigger 80 extends through a trigger aperture 92 formed in the face plate 24 (see FIG. 7).

A positioning lever 94 is pivotally retained on the chassis 22 by a shaft 96. A first end 98 of the lever 94 abuts a protrusion 100 extending from a side of the deadlock latch 46. A second end 102 of the lever 94 is positioned for pivotal abutment against a corresponding trigger flange or arm 82. The positioning lever 94 is dimensioned and retained such that when the trigger 80 extends from the chassis 22, the second end 102 abuts the flange 82 and is driven toward the inside surface of the face plate 24 under the influence of the biasing springs 86 resulting in the first end 98 being drive into abutment against the protrusion 100. Abutment of the first end 98 against the protrusion 100 results in rotating or pivoting the deadlock latch 46 out of the way of the latch bolt 36 thereby preventing engagement of the lip 52 with the teeth 54.

When the trigger 80 is retracted into the chassis 22, the protrusion 100 abuts the first end 98, and since the deadlock latch 46 is spring loaded by the spring 50, the deadlock latch 46 pivots upwardly so that the lip 52 is positioned in the rotary path of the teeth 54. With the deadlock latch 46 positioned as such, the latch bolt 36 cannot be retracted into the chassis 22 and therefore the tip 38 remains engaged with the recess 34 preventing displacement of the door relative to the frame.

The drive lever 70, as discussed hereinabove, is attached to the chassis 22, the offset drive link 72 and the latch bolt 36. The drive lever 70 includes a first arm 104 and a second arm 106. The arms 104, 106 are joined at an elbow 108. The first arm is attached at one end to the chassis 22 by a pivot bushing 110 and includes biasing means 112. Attachment of the first arm 104 to the chassis 22 is accomplished by the deadlock shaft 48 passing through the bushing 110 and the biasing means 112. The drive lever 70 is biased in an upwardly directed orientation by the biasing means 112 as will be described in further detail hereinbelow. A second end of the first arm 104 positioned approximate to the elbow 108 is connected to the second end 76 of the offset drive link 72. A pin 114 is retained in an aperture 116 formed approximate to the elbow 108 and through corresponding apertures 118 in the second end 76.

A distal end 120 of the second arm 106 is cooperatively engaged with the latch bolt 36 by a lost motion link 122. The lost motion link 122 includes a triangular aperture 124 formed in the latch bolt 36 and a shaft 126 which is retained in and extends through the aperture 124 and an aperture 128 formed through the end 120 of the second arm 106.

A secondary operating lever 130 is operatively associated with a key operated cylinder (not shown). The secondary operating lever 130 is attached to the chassis 22 by fasteners 134 which extend through a wall 136 of the chassis 22 to engage a head 138 of the lever 130. The secondary operating lever 130 provides a manual alternative to the electric motor 56 to operate the linkage assembly 66. A similar manual secondary operating lever 130 is shown and described in U.S. Pat. No. 4,237,711 issued Dec. 9, 1990 to Kambic assigned to the same assignee of the present invention. The Kambic '711 reference is incorporated herein by reference.

The preferred embodiment also includes holdback means 140 which is operatively associated with the trigger 80 and the linkage assembly 66 for releasably holding the latch bolt 36 in a retracted position. The holdback means 140 includes a lever 142 and biasing means 144 connected to a side panel 146 of the chassis 22. Included in the biasing means 144 is a stop protrusion 148 and a coiled spring 150. Abutment of the coiled spring 150 against the stop protrusion 148 provides a biasing force against the lever 142. The lever is normally biased in a direction to engage the pin 114 in the linkage assembly 66.

A first end of the lever 142 defines linkage engaging means 152 and a second end 154 of the lever 142 defines trigger engaging means 154. The biasing spring 150 imposes a force on the trigger engagement means 154 to press against the corresponding trigger arm 82. When the trigger 80 is retracted into the chassis 22 the lever 142 is biased so that a notch 155 engages the pin 114 as the latch bolt 36 is retracted to retain the latch bolt 36 in the retracted position. Biasing forces in the trigger springs 82 are greater than the holdback means spring 150. When the trigger is extended the action of the trigger arm 82 on the trigger engaging means 154 overcomes the biasing force in the spring 150 and pivots the lever 142 to disengage the notch 155 from the pin 114.

Figure 2:
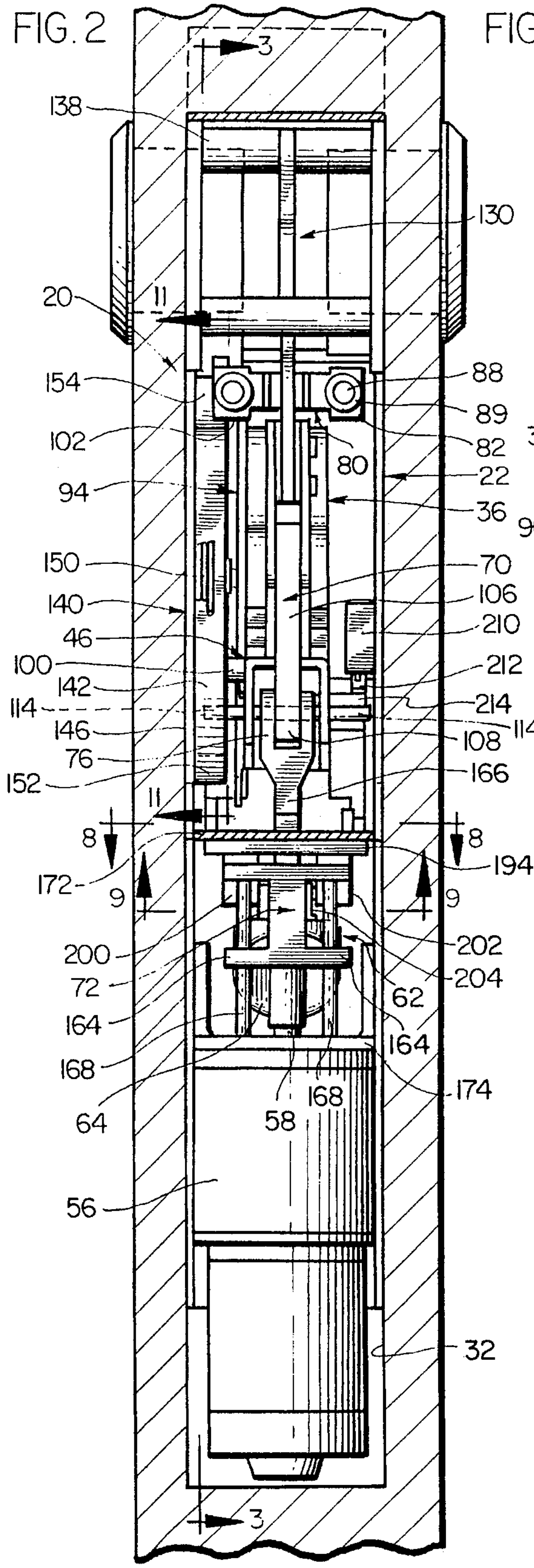
FIG. 2 is a partial fragmentary, cross-sectional, side elevational view of the assembled lock mechanism of FIG. 1 mounted in a cavity of a door frame assembly as viewed from a rear side of the lock mechanism.
Figure 3:
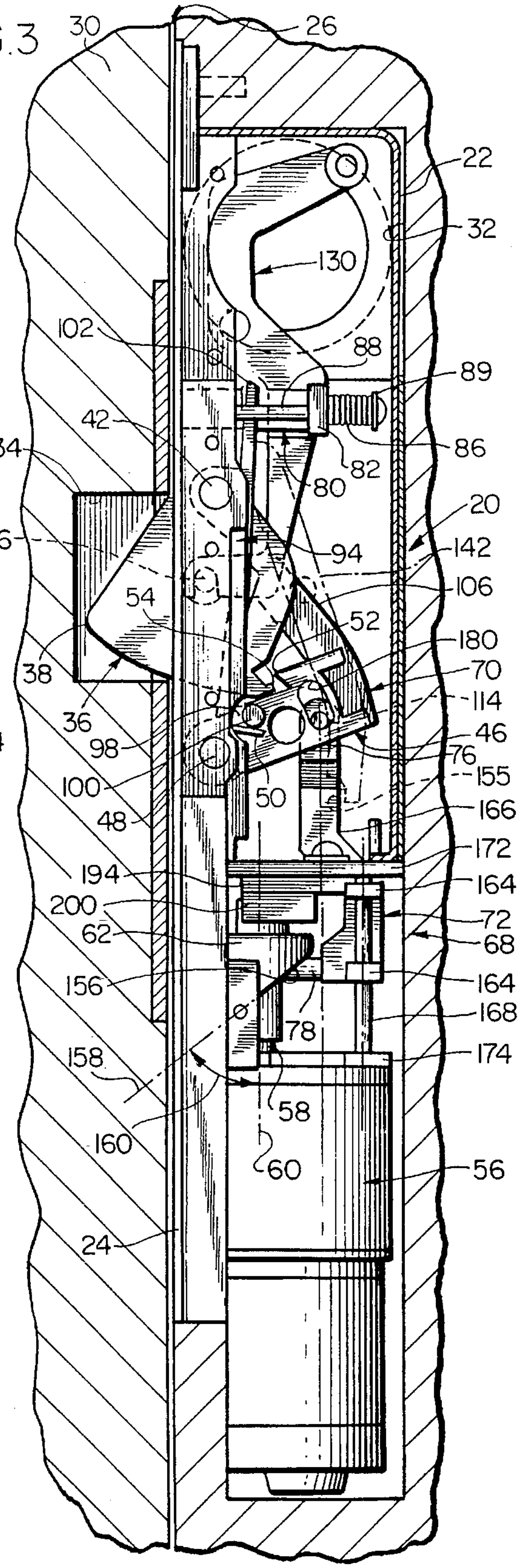
FIG. 3 is a partial fragmentary, cross-sectional, side elevational view taken along line 3—3 in FIG. 2 showing a latch bolt engaged with a recess and a deadlock latch positioned for resisting retraction of the latch bolt into the locking mechanism.

Having now described the general components of the lock mechanism 20 and the basic operation of these components, further discussion is provided hereinbelow of the operating conditions and the interaction of these components with one another. Turning to FIGS. 2 and 3, partial fragmentary cross-sectional side elevational views are shown to illustrate the cooperation and position of the components when the lock mechanism 20 is operated to lock the latch bolt 36 into engagement with the corresponding recess 34.

As shown in FIGS. 2 and 3, the chassis 22 is retained in the cavity 32 with the tip 38 of the latch bolt 36 extending from the chassis and projecting into the recess 34. Positioning of the door 28 in the frame 30 drives the slopped surface 90 of the trigger 80 against the frame which forces the trigger 80 into the chassis 22 against the outwardly biasing force of the trigger springs 82. Displacement of the trigger arm 84 away from the second end 102 of the positioning lever 94 relieves the force from the first end 98 on the protrusion 100. Since the force is relieved, the spring 50 associated with the deadlock latch 46 rotates the latch upwardly. The rotation of the latch places the lip 52 in position to engage the teeth 54 on the latch bolt 36. The relative position of the latch bolt 36 and the deadlock latch 46 provides locked engagement of the lock mechanism 20 with the door assembly 26. The linkage assembly 66 generally is not engaged in this locked position.

As shown in FIGS. 2–6, the cam body 62 includes a driving surface 156 which lies in a plane 158 disposed at an angle 160 relative to the central axis 60. The cam bearing 78 abuts the driving surface 156. As more clearly shown in FIG. 2, the driving surface 156 is defined by an arcuate rim 162 formed on the downwardly directed edge of the cam 62.

Figure 4:
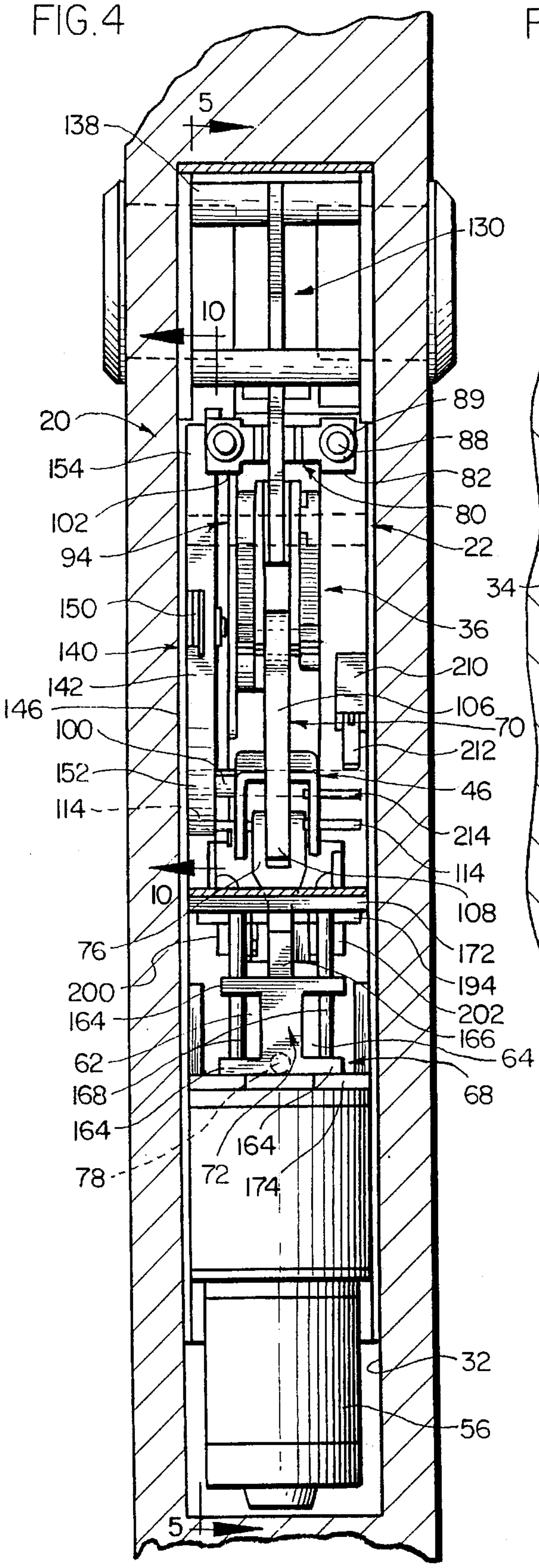
FIG. 4 is a partial fragmentary, cross-sectional side elevational view as shown in FIG. 2 in which a motor has operated a cam to drive an offset drive link downwardly to retract the latch bolt into the lock mechanism.
Figure 5:
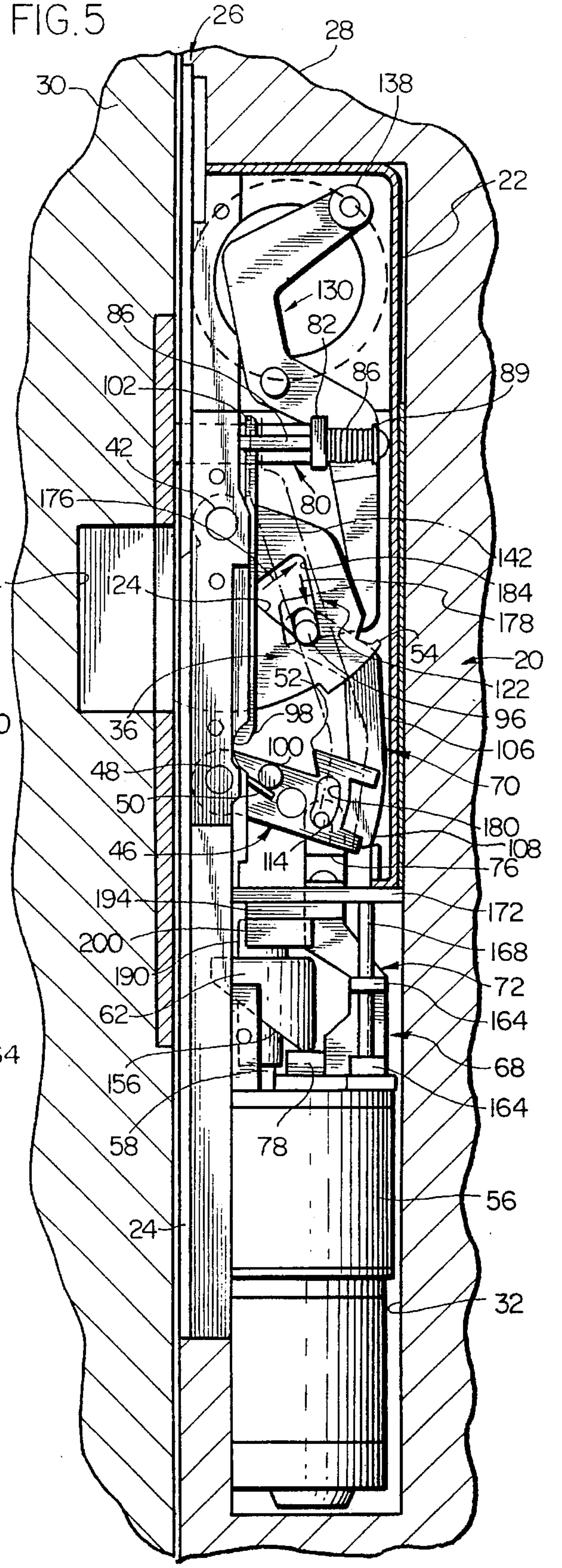
FIG. 5 is a side elevational view taken along line 5—5 in FIG. 4 showing the cam which has been operated by the motor to drive a cam roller downwardly along with the attached offset drive link to retract the latch bolt into the lock mechanism chassis.
Figure 6:
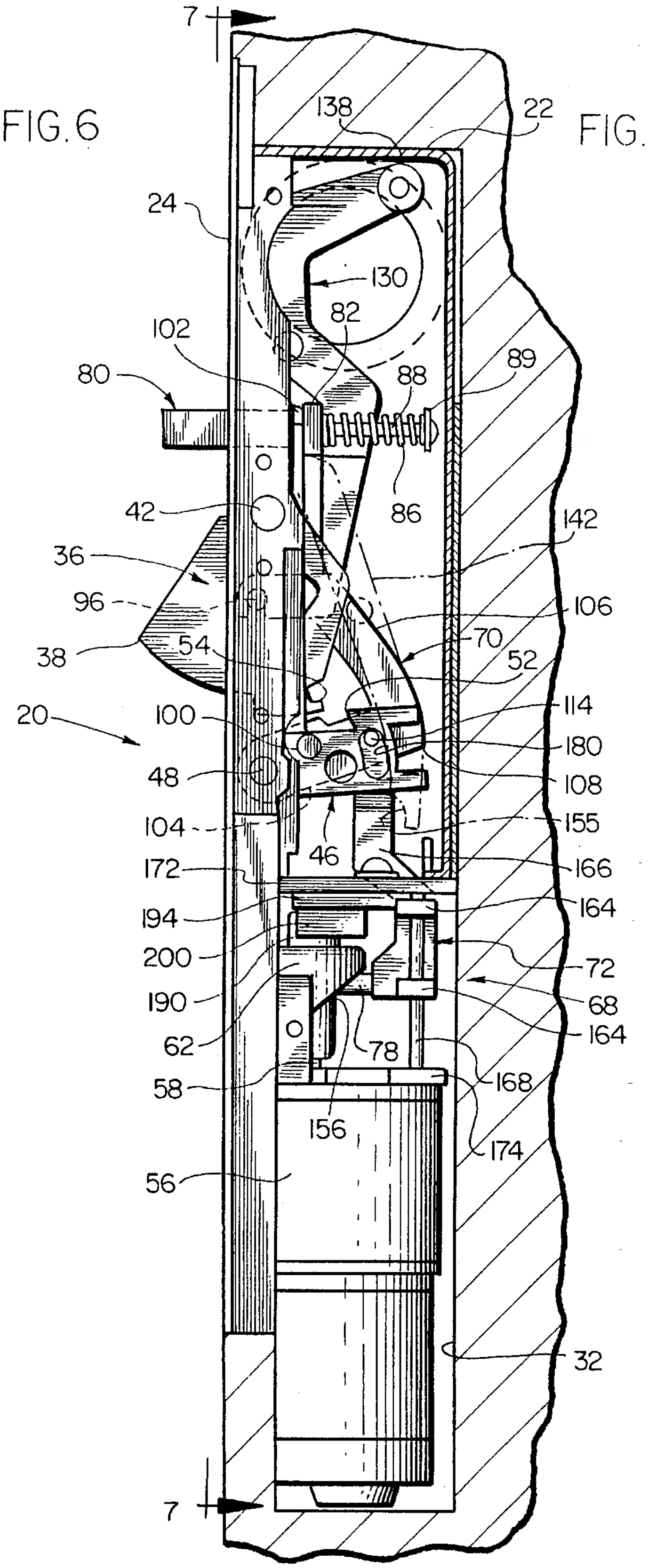
FIG. 6 is a partial fragmentary side-elevational view of the lock mechanism showing the position of the lock components when the door is disengaged from the frame with both the latch bolt and a trigger extending from the lock mechanism chassis.

In the locked condition in FIGS. 2 and 3, the cam body 62 and cam follower 68 are arranged in an upwardly disposed position. When the cam 62 as shown in FIGS. 2 and 3 is rotated about the central axis 60, the cam bearing 78 is driven downwardly due to the movable engagement of the bearing 78 against the arcuate rim 162. As a result, the offset drive link 72 is generally linearally displaced due to the mechanical advantage of the cam 62 driven by the motor 56. FIGS. 4 and 5 show the drive link 72 in the downwardly disposed position after a one-half cycle operation of the cam.

Rotation of the cam 62 about the central axis tends to impose a rotational force on the cam bearing 78 which is generally perpendicular to the central axis. As such, the cam bearing 78 is a rolling bearing which allows rotary movement of the bearing 78 upon rotation of the cam 62. The rotary movement of the bearing 78 helps reduce the friction and wear which might otherwise be caused by the action of the arcuate rim 162 being rotated relative to the bearing 78.

The directional, rotational movement of the cam 62 does, however, tend to transfer a twisting force to the offset drive link 72. To counteract the twisting forces, the drive link 72 includes a pair of spaced-apart guide arms 164 positioned on each side of a central elongated body portion 166. A guide pin 168 extends generally parallel to the elongated body 166 through apertures 170 formed in the guide arms 164. The guide pins 168 are fixed in an orientation parallel to the central axis 60 between a switch and guide mounting bracket 172, above, and a motor mounting bracket 174 below. The brackets 172, 174 are securely mounted to the chassis 22. Twisting forces which are transferred to the drive link 72 are resisted and minimized by the spaced-apart, parallel alignment of the guide arms 164 moving along the corresponding guide pins 168.

Mounting and retention of the cam 62 on the motor 56 and to the chassis 22 prevents further undesirable movement. The cam 62 is retained on the drive shaft 58 along the central axis 60 by means of a locking fastener 186 which projects through the cam and engages a flat 188 on the drive shaft 58. Proper alignment of the cam 62 is maintained by an upper end of the cam 62 which includes a cam shaft 190 projecting through a shaft aperture 193 formed through an adjustable plate attached to the switch mounting bracket 172. A close tolerance is maintained between the cam shaft 190 and the shaft aperture 193 to prevent tilting or wobbling of the cam. Retention of the cam 62 at the top and the bottom prevents the cam 62 from canting when it is driven by the motor and acts upon the cam follower 68. As such, both the cam follower 68 and the cam 62 are retained against canting movement to provide smooth operation, in the case of the follower generally vertical displacement, and in the case of the cam, generally rotary movement.

With further reference to FIG. 2, the hold back means 140 is shown with both the linkage engagement means 152 and the trigger engaging means 154 being disengaged. In FIG. 4 the linkage engaging means 152 is engaged with the pin 114. It should be noted that the holdback means 140 is shown in phantom in FIGS. 3, 5 and 6 in the interest of clearly representing the other components of the lock mechanism 20.

Turning now to FIG. 4 and 5, the lock mechanism 20 has been operated so that the latch bolt 36 is retracted into the chassis 22 thereby disengaging the latch bolt 36 from the recess 34. The door 28 is still positioned in the frame 30 and as such the trigger 80 remains in the retracted position.

It was mentioned hereinabove that the deadlock latch 46 prevents the latch bolt 36 from moving as a result of the spring 50 providing a biasing force to bias the deadlock latch 46 into the upward position. When the cam is operated, however, the linkage assembly 66 disengages the deadlock latch 46 prior to rotating or pivoting the latch bolt 36. As such, when the latch bolt 36 is rotated, the lip 52 of the deadlock latch 46 is clear of the teeth 54 of the latch bolt 36. Movement of the deadlock latch 46 prior to the movement of the latch bolt 36 is accomplished as a result of the lost motion link 122. The triangular aperture 124 restricts movement of the shaft 126 extending therethrough first to a generally rearward movement (as represented by direction arrow 176) and then a generally downward movement (as represented by direction arrow 178). The pin 114 extending through an elongated aperture 180 of the deadlock latch 46 is retained in the aperture 116 near the elbow 108 of the drive lever 70.

Downward movement of the offset drive link 72, as a result of rotation of the cam 62, drives the pin 114 downwardly thereby rotating the associated deadlock latch 46. The degree of rotation of the deadlock latch 46 is sufficient to provide clearance between the lip 52 and the teeth 54. Displacement of the deadlock latch 46 occurs during the rearward movement (176) of the shaft 126. The latch bolt 36 is rotated inwardly into the chassis 22 when the shaft 126 drives downwardly and rearwardly (178) against an abutting surface 184 of the triangular aperture 124.

As shown in FIGS. 4 and 5, the above-described action of the components in,the lock mechanism 20 have been facilitated by rotation of the cam 62 and driving of the cam follower 68. Once the cam bearing 78 has been driven downwardly by the rotary action of the cam 162, the cam follower 68 can be retained in an open position indefinitely if the motor is deactivated. The cam will not rotate any further unless the electric motor 56 is energized to rotate the cam and allow the follower 68 to travel upwardly. As such, when the door is opened the lock mechanism 20 is unlocked and when the door closes the lock mechanism remains unlocked until the cam is further driven to relock the mechanism.

The cam and motor arrangement of the present invention is highly advantageous compared to the solenoid-actuated type devices because the motor does not need to be continuously activated to retain the cam follower 68 in the downward most position to hold the latch bolt in the retracted position. In contrast, deactivation of the electric motor in the preferred embodiment as shown herein retains the cam follower 68 in the desired position. As such, the present invention provides the mechanical advantages of the rotary driven cylindrical cam 62 along with the retaining or locking advantages of the electric drive motor 56.

Figure 10:
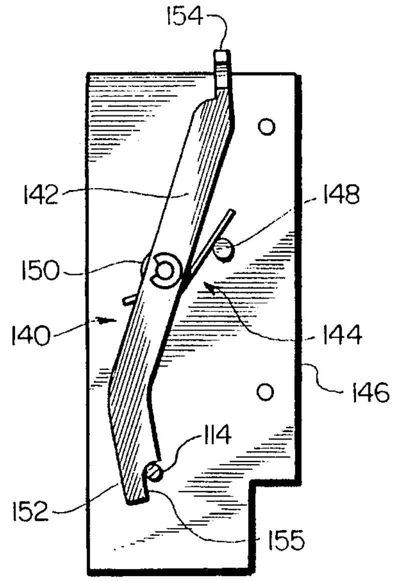
FIG. 10 is a partial fragmentary, cross-sectional, side elevational view of a side plate of the chassis and the attached latch back lever taken along line 10—10 in FIG. 4 which is operated and engaged with a pin to hold the latch bolt in a retracted position and is operated by the deadlock trigger to automatically release the latch bolt from a locked position when the door is opened and the trigger is allowed to extend from the face plate.
Figure 11:
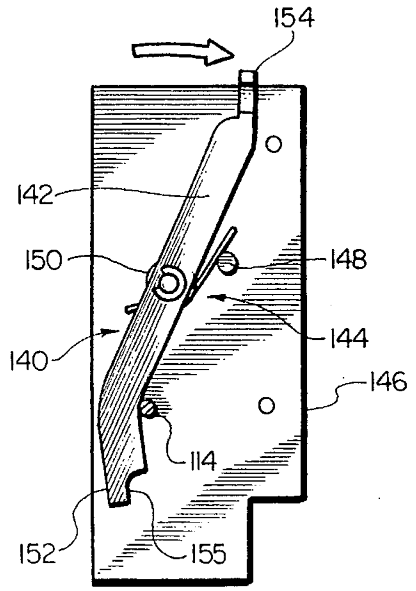
FIG. 11 is a side elevational view of the side plate and the latch back lever taken along line 11—11 in FIG. 2 with the lever disengaged from the pin by the deadlock trigger.

Additionally, the lock mechanism 20 can be operated from the position as shown in FIGS. 2 and 3 to the position as shown in FIGS. 4 and 5. With reference to FIG. 11, the lever 142 is shown in its position in FIGS. 2 and 3 whereby the notch 155 of the linkage engaging means 152 is not engaged with the pin 114. As the mechanism is operated to the positions as shown in FIGS. 4 and 5, the biasing forces provided by the spring 150 rotate the linkage engagement means 152 into engagement with the pin 114 as shown in FIG. 10. The biased rotation of the lever 142 occurs since the trigger 80 is retracted into the chassis. The position of the lever 142 with the pin 114 retained by the engaging means 152 can be seen in phantom line in FIG. 5.

With the pin 114 retained in the notch 155, the latch bolt 36 is retained in its recessed position until the trigger 80 is released. When the trigger 80 is released, the trigger arm 84 drives against the trigger engaging means 54 to rotatably disengage the notch 155 from the pin 114. This disengaging action is achieved by first operating the cam 62 one-half cycle to engage the pin 114 as described hereinabove to retain the latch bolt 36 in its retracted position. Then the cam is operated another one-half cycle to continue to operate the cam 62 so that it is returned to the operating position as shown in FIGS. 2 and 3.

As shown in FIGS. 2 and 3, the cam is oriented to allow the cam follower 68 to be positioned in the uppermost position. The importance of this feature is that the latch bolt is held retracted while the door is opened but as soon as the door is displaced from the frame, the trigger 80 is biased outwardly by the trigger spring 82 thereby striking the arm against the trigger engaging means and disengaging the linkage engagement means 152 from the pin 114.

The pin 114 is retained in the drive lever 70 and interconnects the drive lever 70, the deadlock latch 46 and the offset drive link 72. All of these components are biased in the upward direction to return all of these components to a position to extend the latch bolt 36 from the chassis 22. Therefore, when the pin 114 is released, and the cam 62 is positioned with the uppermost portion of the rim directed as shown in FIGS. 2 and 3, the linkage assembly 60 drives upwardly under the influence of the biasing forces provided by the springs 44, 112 to extend the latch bolt 36 through the aperture 40.

The above-described operating conditions are important because in the first condition, the cam and motor can be used to maintain the latch bolt in a retracted position (the lock mechanism 20 is unlocked) without exerting additional strain on the motor or components. In the second condition, it is important to provide an automatic locking feature. As such, the cam is rotated a half cycle to disengage or retract the latch bolt whereupon the holdback means 140 retains the latch bolt in the retracted position. The cam 62 continues to operate to make a full rotation to return the cam into the locked position. When the door is displaced from the frame, the trigger pops out through the corresponding aperture thereby striking and disengaging the holdback means 140 from the pin 114 and automatically extending the latch bolt through the corresponding aperture. Therefore, when the door closes in the second condition, it automatically locks without further operation of the lock mechanism 20.

Figure 8:
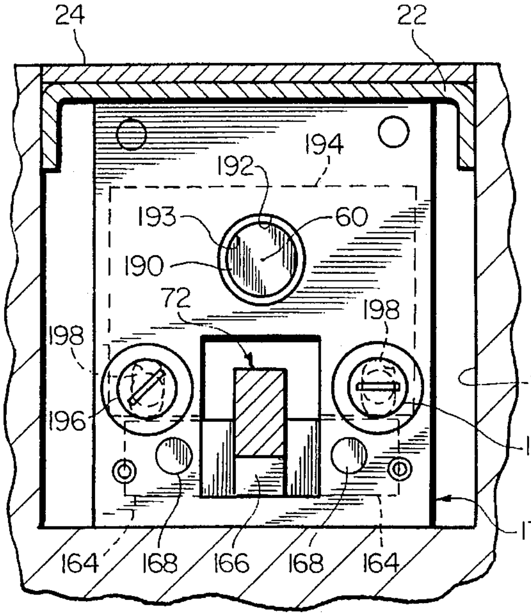
FIG. 8 is a partial fragmentary, cross-sectional top plan view taken line 8—8 in FIG. 2 of a switch and guide pin mounting bracket.
Figure 9:
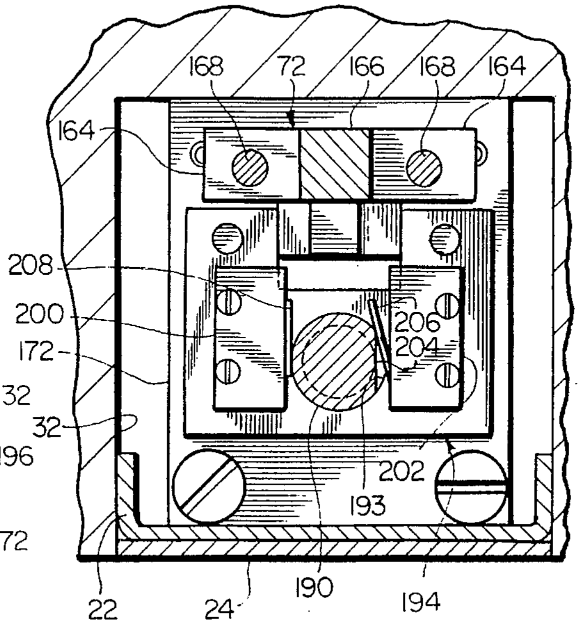
FIG. 9 is a partial fragmentary, cross-sectional, bottom plan view taken along line 9—9 in FIG. 2 of an adjustable switch mounting plate attached to the underside of the switch and guide pin mounting bracket.

With further reference to FIGS. 8 and 9, the present invention includes an adjustable mounting plate 194. The guide aperture 192 extending through the switch mounting bracket is generally coaxial with a shaft aperture 193 in the mounting plate 194. As shown in FIG. 8, the guide aperture 192 formed through the mounting bracket 172 is slightly larger than the shaft aperture 193 formed in the adjustable plate 194. The difference in the aperture sizes allows a degree of adjustment to be made so that the cam 62 is properly axially aligned relative to the central axis 60. A pair of mounting fasteners 196 which extend through the switch mounting bracket 172 through oversized bores 198 (shown in phantom line underneath the fasteners 196) secure the adjustable plate 194 to a bottom side of the bracket 172.

Also attached to the adjustable plate 194 is a pair of cycle switches 200, 202. As shown in FIG. 9, the switch on the left hand side of the FIG. 9 will be referred to as the half cycle switch 200 and the switch shown on the right-hand side of FIG. 9 will be referred to as the full cycle switch 202.

The cam shaft 190 includes a flattened face 204 which is oriented on the outside surface of the cam shaft 190 to indicate, in combination with the switches 200, 202, the position of the cam and therefore the condition of the lock mechanism 20. For example, when the cam 62 is in the position as shown in FIGS. 2 and 3, an actuator 206 of the full cycle switch 202 extends from the switch 202 and contacts the flat 204. An actuator 208 of the half cycle switch 200 is retracted against the switch 200 as it abuts the arcuate outside surface of the shaft 190. In this manner, the switches 200, 202 are operated to detect the position of the cam 62 as a result of the position of the cam flat 204.

The full cycle switch 202 indicates that the offset drive link 172 is in the uppermost position and that the latch bolt 36 is extending from the chassis 22. Alternatively, as discussed hereinabove, the latch bolt 36 is held in a retracted position subject to disengagement of the trigger from the door frame which will disengage the holdback means 140 and allow the latch bolt 36 to extend from the chassis 22. The half cycle switch operates when the actuator 208 extends against the flat 204 when the cam 62 has rotated one-half cycle to the position as shown in FIGS. 4 and 5.

Additionally, it should be noted with reference to the discussion of the adjustable plate 194 hereinabove, the switches 200, 202 are attached to this plate. In this regard, since the switches are mounted on the plate relative to the cam shaft aperture 193, the switch actuators 206, 208 are always properly positioned relative to the cam shaft 190.

A deadlock indicator switch 210 is mounted to the chassis 22 having an actuator 212 engaged by a pin 214 carried on the deadlock 46. The switch 210 senses whether the deadlock latch 46 is in the blocking or non-blocking position. The switch 210 acts in response to the position and operation of the trigger 80. For example, when the deadlock latch 46 is positioned as shown in FIGS. 2 and 3, the actuator 212 is positioned upwardly towards the switch 210 by the pin 214. As such, the switch 210 indicates that the deadlock latch 46 is engaged. As shown in FIGS. 4 and 5, the trigger 80 is still retracted however, the actuator 212 of the switch 210 is biased away from the switch 210 since the pin 214, riding on the deadlock latch 46, is downwardly displaced away from the switch 210. This condition indicates that the deadlock 46 is disengaged from the latch bolt 36.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A lock mechanism for use with a door assembly having a door and a frame, said lock mechanism being attached to one of said door and said frame, the other of said door and frame having an aperture therein positioned opposite said lock mechanism, said lock mechanism comprising:

a chassis for attachment to said door assembly;

a face plate attached to said chassis and having a latch aperture formed therein;

a latch bolt operatively connected to said chassis for movement between an extending position wherein a tip portion of said latch bolt extends from said chassis through said latch aperture and a retracted position where said tip portion is retracted into said chassis through said latch aperture;

deadlock structure operatively associated with said chassis for selectively blocking movement of said latch bolt;

a rotary drive motor attached to said chassis for providing a rotary driving force to operate said latch bolt;

a cylindrical cam structure connected to said rotary drive motor for producing a mechanical advantage in driving said latch bolt said cylindrical cam structure having a driving surface disposed at an angle;

a linkage assembly operatively associated with said chassis, said linkage assembly operatively linking said latch bolt, said deadlock structure said linkage assembly have a cam follower means abutting said driving surface of said cam structure for transferring driving forces from said motor to operate said lock mechanism.

2. A lock mechanism as recited in claim 1, said cam structure further comprising a cylindrical cam body being connected to said rotary drive motor, said rotary drive motor having a drive shaft defining a coaxially extending central axis, said cylindrical cam body being attached to said drive shaft and being axially rotatable along said central axis for acting on said linkage assembly to operate said latch bolt.

3. A lock mechanism for use with a door assembly having a door and a frame, said lock mechanism being attached to one of said door and said frame, the other of said door and frame having an aperture therein positioned opposite said lock mechanism, said lock mechanism comprising;

a chassis for attachment to said door assembly;

a face plate attached to said chassis and having a latch aperture formed therein;

a latch bolt operatively connected to said chassis for movement between an extending position wherein a tip portion of said latch bolt extends from said chassis through said latch aperture and a retracted position where said tip portion is retracted into said chassis through said latch aperture;

deadlock structure operatively associated with said chassis for selectively blocking movement of said latch bolt;

a drive motor attached to said chassis for providing a driving force to operate said latch bolt;

cam structure operatively associated with said motor for producing a mechanical advantage in driving said latch bolt;

a linkage assembly operatively associated with said chassis, said linkage assembly operatively linking said latch bolt, said deadlock structure and said cam structure for transferring driving forces from said motor to operate said lock mechanism;

said cam structure including a cylindrical cam body being connected to said drive motor, said drive motor having a drive shaft defining a coaxially extending central axis, said cylindrical cam body being attach to said drive shaft and being axially rotatable along said central axis for acting on said linkage assembly to operate said latch bolt;

said cylindrical cam body having a driving surface lying in a plane generally disposed at an angle to said central axis, said linkage assembly having a cam follower operatively engaged with said driving surface of said cylindrical cam body, whereby said cam follower is displaced axially generally parallel to said central axis upon rotary operation of said cylindrical earn body.

4. A lock mechanism as recited in claim 3, said driving face defining an angled arcuate rim, said angled arcuate rim being generally concentric with said central axis.

5. A lock mechanism as recited in claim 3, said cam follower further comprising:

an offset drive link having an elongated body, a first end of said elongated body being axially offset from said central axis, a second end of said elongated body being operatively associated with said latch bolt, said offset drive link being translatable generally parallel to said central axis; and a cam bearing attached to said first end of said elongated body abutting said driving surface of said cylindrical cam body;

whereby rotation of said cylindrical cam body translates said offset drive link to operate said latch bolt.

6. A lock mechanism for use with a door assembly having a doors and a frame, said lock mechanism being attached to one of said door and said frame, the other of said door and frame having an aperture therein positioned opposite said lock mechanism, said lock mechanism comprising:

a chassis for attachment to said door assembly;

a face plate attached to said chassis and having a latch aperture formed therein;

a latch bolt operatively connected to said chassis for movement between an extending position wherein a tip portion of said latch bolt extends from said chassis through said latch aperture and a retracted position where said tip portion is retracted into said chassis through said latch aperture;

deadlock structure operatively associated with said chassis for selectively blocking movement of said latch bolt;

a drive motor attached to said chassis for providing a driving force to operate said latch bolt, said drive motor having a drive shaft defining a central axis;

cam structure including a cylindrical cam body coupled to said drive shaft said motor for producing a mechanical advantage in driving said latch bolt;

a linkage assembly operatively associated with said chassis, said linkage assembly operatively linking said latch bolt, said deadlock structure and said cam structure for transferring driving forces from said motor to operate said lock mechanism;

an offset drive link having an elongated body, a first end of said elongated body being axially offset from said central axis, a second end of said elongated body being operatively associated with said latch bolt, said offset drive link being translatable generally parallel to said central axis;

a cam bearing attached to said first end of said elongated body operatively engaging said cylindrical cam body;

a first bracket attached to said chassis extending generally perpendicular to said central axis;

a second bracket attached to said chassis spaced apart from said first bracket and extending generally perpendicular to said central axis;

a pair of spaced apart guide pins, a first end of each guide pin being attached to said first bracket and a second end of each guide pin being attached to said second bracket; and guide structure attached to said first end of said offset drive link, said guide structure movably engaging said guide pins for guiding said offset drive link generally parallel to said central axis.

7. A lock mechanism as recited in claim 6, said guide structure including a pair of spaced apart guide arms extending from opposite sides of said offset drive link, each pair spaced apart guide arms movably engaging said a corresponding one of said pair of spaced apart guide pins, whereby said guide arms and said guide pins resist rotational forces which may be transferred from said cylindrical cam when driven by said drive motor.

8. A lock mechanism as recited in claim 6, wherein said drive motor is attached to said first bracket, a drive shaft of said drive motor extending through said first bracket, said cylindrical cam body having a driving surface lying in a plane generally disposed at an angle to said central axis, said cam bearing operatively engaged with said driving surface of said cylindrical cam body, a cam shaft projection from said cam opposite said drive shaft and operatively engaged with said second bracket.

9. A lock mechanism as recited in claim 1, further comprising switch structure operatively associated with said cam structure, said switch structure being operated by said cam structure for indicating the position of said latch bolt and controlling said motor to operate said latch bolt.

10. A lock mechanism for use with a door assembly having a door and a frame, said lock mechanism being attached to one of said door and said frame, the other of said door and frame having an aperture therein positioned opposite said lock mechanism, said lock mechanism comprising:

a chassis for attachment to said door assembly;

a face plate attached to said chassis and having a latch aperture and a trigger aperture formed therein;

a latch bolt operatively connected to said chassis for movement between an extending position wherein a tip portion of said latch bolt extends from said chassis through said latch aperture and a retracted position where said tip portion is retracted into said chassis through said latch aperture;

deadlock structure operatively associated with said chassis for selectively blocking movement of said latch bolt;

a trigger operatively connected to said chassis for biased movement between an extending position wherein a tip portion of said trigger extends from said chassis through said trigger aperture and a retracted position where said tip portion is retracted into said chassis through said trigger aperture, said trigger being operatively associated with said deadlock structure for enabling said deadlock structure when said trigger is retracted and disabling said deadlock structure when said trigger is extended;

a drive motor attached to said chassis for providing a driving force to operate said latch bolt;

cam structure operatively associated with said drive motor for producing a mechanical advantage in driving said latch bolt;

a linkage assembly operatively associated with said chassis, said linkage assembly operatively linking said latch bolt, said deadlock structure and said cam structure for transferring driving forces from said rotary drive motor to operate said lock mechanism; and hold back means operatively associated with said trigger and said linkage assembly for releasably holding said latch bolt in a retracted position.

11. As recited in claim 10, said hold back means comprising:

a lever and biasing structure attached to said chassis, said biasing structure biasing said lever into a position for engaging a portion of said linkage assembly;

a first end of said lever defining linkage engaging structure;

a second end of said lever defining trigger engaging structure;

whereby said linkage engaging structure engages a portion of said linkage assembly when said trigger is in a retracted position in said chassis and said latch bolt is retracted into said chassis by operation of said drive motor and cam structure to hold said latch bolt in the retracted position, and said linkage engaging structure being disengaged from said portion of said linkage assembly when said trigger contacts said trigger engaging structure upon biasedly extending said trigger through said trigger aperture.

12. A lock mechanism for use with a door assembly having a door and a frame, said lock mechanism being attached to one of said door and said frame, the other of said door and frame having an aperture therein positioned opposite said lock mechanism, said lock mechanism comprising:

a chassis for attachment to said door assembly;

a face plate attached to said chassis and having a latch aperture and a trigger aperture formed therein;

a latch bolt operatively connected to said chassis for movement between an extending position wherein a tip portion of said latch bolt extends from said chassis through said latch aperture and a retracted position where said tip portion is retracted into said chassis through said latch aperture;

deadlock structure operatively associated with said chassis for selectively blocking movement of said latch bolt;

a trigger operatively connected to said chassis for biased movement between an extending position wherein a tip portion of said trigger extends from said chassis through said trigger aperture and a retracted position where said tip portion is retraced into said chassis through said trigger aperture, said trigger being operatively associated with said deadlock structure for enabling said deadlock structure when said trigger is retracted and disabling said deadlock structure when said trigger is extended;

a drive motor attached to said chassis for providing a driving force to operate said latch bolt;

a cylindrical cam body connected to said rotary drive motor for producing a mechanical advantage in driving said latch bolt hold back structure operatively associated with said trigger and said linkage assembly for releasably holding said latch bolt in a retracted position;

said cylindrical cam body having a driving surface lying in a plane generally disposed at an angle to said central axis, said linkage assembly having a cam follower operatively engaged with said driving surface of said cylindrical cam body, whereby said cam follower is displaced axially generally parallel to said central axis upon rotary operation of said cylindrical cam body, said drive motor having a drive shaft defining a coaxially extending central axis, said cylindrical cam body being attached to said drive shaft and being axially rotatable along said central axis for acting on said linkage assembly to operate said latch bolt, a linkage assembly operatively associated with said chassis, said linkage assembly operatively linking said latch bolt, said deadlock structure and said cam structure for transferring driving forces from said rotary drive motor to operate said lack mechanism.

13. A lock mechanism as recited in claim 12, said cam follower further comprising:

an offset drive link having an elongated body, a first end of said elongated body being axially offset from said central axis link, a second end of said elongated body being operatively associated with said latch bolt, said offset drive link being translatable generally parallel to said central axis; and a cam bearing attached to said first end of said elongated body abutting said driving surface of said cylindrical cam body;

whereby rotation of said cylindrical cam body translates said offset drive link to operate said latch bolt.

14. A lock mechanism for use with a door assembly having a door and a frame, said lack mechanism being attached to one of said door and said frame, the other of said door and frame having an aperture therein positioned opposite said lock mechanism, said lock mechanism comprising:

a chassis for attachment to said door assembly;

a face plate attached to said chassis and having a latch aperture and a trigger aperture formed therein;

a latch bolt operatively connected to said chassis for movement between an extending position wherein a tip portion of said latch bolt extends from said chassis through said latch aperture and a retracted position where said tip portion is retracted into said chassis through said latch aperture;

deadlock structure operatively associated with said chassis for selectively blocking movement of said latch bolt;

a trigger operatively connected to said chassis for biased movement between an extending position wherein a tip portion of said trigger extends from said chassis through said trigger aperture and a retracted position where said tip portion is retracted into said chassis through said trigger aperture, said trigger being operatively associated with said deadlock structure for enabling said deadlock structure when said trigger is retracted and disabling said deadlock structure when said trigger is extended:

a drive motor attached to said chassis for providing a driving force to operate said latch bolt:

cam structure operatively associated with said drive motor for producing a mechanical advantage in driving said latch bolt;

a linkage assembly operatively associated with said chassis, said linkage assembly operatively linking said latch bolt, said deadlock structure and said cam structure for transferring driving forces from said rotary drive motor to operate said lock mechanism;

an offset drive link having an elongated body, a first end of said elongated body being axially offset from said central axis link, a second end of said elongated body being operatively associated with said latch bolt, said offset drive link being translatable generally parallel to said central axis;

a cam bearing attached to said first end of said elongated body operatively engaging said cylindrical cam body;

a first bracket attached to said chassis extending generally perpendicular to said central axis;

a second bracket attached to said chassis spaced apart from said first bracket and extending generally perpendicular to said central axis;

a pair of spaced apart guide pins, a first end of each guide pin being attached to said first bracket and a second end of each guide pin being attached to said second bracket; and guide structure attached to said first end of said offset drive link, said guide structure movably engaging said guide pins for guiding said offset drive link generally parallel to said central axis.

15. A lock mechanism as recited in claim 14, wherein said drive motor is attached to said first bracket, a drive shaft of said drive motor extending through said first bracket, said cylindrical cam body having a driving surface lying in a plane generally disposed at an angle to said central axis, said cam bearing operatively engaged with said driving surface of said cylindrical cam body, a cam shaft projection from said cam opposite said drive shaft and operatively engaged with said second bracket.

16. A lock mechanism as recited in claim 10, further comprising switch structure operatively associated with said cam structure, said switch structure being operated by said cam structure for indicating the position of said latch bolt and controlling said motor to operate said latch bolt.

17. A lock mechanism for use with a door assembly having a door and a frame, said lock mechanism being attached to one of said door and said frame, the other of said door and frame having an aperture therein positioned on said door assembly opposite said lock mechanism, said lock mechanism comprising:

a chassis for attachment to said door assembly;

a face plate having a first aperture and a second aperture formed therein, said face plate being attached to said chassis;

a latch bolt pivotally mounted in said chassis adjacent the front plate for movement between an extending position wherein a tip portion of said latch bolt extends through said first aperture in said face plate and a retracted position where said tip portion is retracted into said chassis through said first aperture;

a deadlock latch pivotally mounted to said chassis for movement between a blocking position for blocking retraction of said latch bolt, and non-blocking position for allowing free movement of said latch bolt;

a drive lever pivotally mounted to said chassis, said drive lever having a first and a second arm, a first end of said first arm being pivotally associated with said chassis and a second end of said first arm being fixed to said second arm and operatively connected with said deadlock latch, a first end of said second arm being operatively connected to said latch bolt, and a second end of said second arm being attached to said second end of said first arm;

biasing structure operatively associated with said drive lever for returning said latch bolt to said extending position;

a drive motor attached to said chassis, a drive shaft of said motor extending from said motor and defining a central axis;

cam structure attached to said drive shaft of said motor, said cam structure being rotated about said central axis by said motor;

a drive link having a first end operatively associated with said cam structure and a second end operatively attached to said drive lever and said dead latch, said drive motor and cam structure selectively moving said drive link generally parallel to said central axis for pivoting said first arm of said drive lever and displacing said second arm of said drive lever to retract said latch bolt.

18. A lock mechanism as recited in claim 17, further comprising hold back structure and a trigger, said hold back structure operatively associated with said trigger and said linkage assembly for releasably holding said latch bolt in a retracted position.

19. A lock mechanism as recited in claim 18, said hold back structure comprising:

a lever and biasing structure attached to said chassis, said biasing means biasing said lever into a position for engaging a portion of said linkage assembly;

a first end of said lever defining linkage engaging means;

a second end of said lever defining trigger engaging means;

whereby said linkage engaging structure engages a portion of said linkage assembly when said trigger is in a retracted position in said chassis and said latch bolt is retracted into said chassis by operation of said drive motor and cam structure to hold said latch bolt in the retracted position, and said linkage engaging structure being disengaged from said portion of said linkage assembly when said trigger contacts said trigger engaging structure upon biasedly extending said trigger through said trigger aperture.

20. A lock mechanism as recited in claim 17, said cam structure further comprising a cylindrical cam body being connected to said drive motor, said drive motor having a drive shaft defining a coaxially extending central axis, said cylindrical cam body being attached to said drive shaft and being axially rotatable along said central axis for acting on said linkage assembly to operate said latch bolt.

21. A lock mechanism as recited in claim 20, said cylindrical cam body having a driving surface lying in a plane generally disposed at an angle to said central axis, said linkage assembly having a cam follower operatively engaged with said driving surface of said cylindrical cam body, whereby said cam follower is displaced axially generally parallel to said central axis upon rotary operation of said cylindrical cam body.

22. A lock mechanism as recited in claim 21, said cam follower further comprising:

an offset drive link having an elongated body, a first end of said elongated body being axially offset from said central axis, a second end of said elongated body being operatively associated with said latch bolt, said offset drive link being translatable generally parallel to said central axis; and a cam bearing attached to said first end of said elongated body abutting said driving surface of said cylindrical cam body;

whereby rotation of said cylindrical cam body translates said offset drive link to operate said latch bolt.

* * * * *

UNITED STATES PATENT AND TRADEMARK OFFICE

CERTIFICATE OF CORRECTION

PATENT NO. : 5,566,991
DATED : October 22, 1996
INVENTOR(S) : Quentin Young

It is certified that error appears in the above-indentified patent and that said Letters Patent is hereby corrected as shown below:

Column 1, Line 16 "Dolt" should be -- bolt --

Column 3, Line 55 "arid" should be --and--

Column 10, Line 60 "earn" should be -- cam --

Column 13, Line 59 "lack" should be --lock--

Column 14, Line 7 "lack" should be -- lock --

Signed and Sealed this

Twenty-fifth Day of March, 1997

Attest:

BRUCE LEHMAN

Attesting Officer

*Commissioner of Patents and Trademarks*